US012672220B1

(12) United States Patent
Huang

(10) Patent No.: US 12,672,220 B1
(45) Date of Patent: Jun. 30, 2026

(54) BUTTON-BASED POWER CONTROLLER

(71) Applicant: NINGBO GOLDEN POWER ELECTRONIC CO., LTD., Ningbo (CN)

(72) Inventor: Yongxing Huang, Ningbo (CN)

(73) Assignee: NINGBO GOLDEN POWER ELECTRONIC CO., LTD., Ningbo (CN)

( * ) Notice: Subject to any disclaimer, the term of this patent is extended or adjusted under 35 U.S.C. 154(b) by 0 days.

(21) Appl. No.: 19/382,348

(22) Filed: Nov. 7, 2025

(30) Foreign Application Priority Data

Mar. 21, 2025 (CN) ......................... 202520503514.2

(51) Int. Cl.
*H05B 47/16* (2020.01)
*H05B 45/34* (2020.01)
*H05B 47/11* (2020.01)

(52) U.S. Cl.
CPC ............. *H05B 47/16* (2020.01); *H05B 45/34* (2020.01); *H05B 47/11* (2020.01)

(58) Field of Classification Search
CPC ...... H05B 47/10; H05B 47/105; H05B 47/11; H05B 47/13; H05B 47/135; H05B 47/16; H05B 45/10; H05B 45/12; H05B 45/20; H05B 45/22; H05B 45/30; H05B 45/34
See application file for complete search history.

(56) References Cited

U.S. PATENT DOCUMENTS

| | | | | |
|---|---|---|---|---|
| 10,512,144 | B1 * | 12/2019 | Shen | H05B 45/20 |
| 10,624,180 | B1 * | 4/2020 | Shen | H05B 45/20 |
| 11,805,580 | B2 * | 10/2023 | Han | H05B 45/10 |
| 2019/0230760 | A1 * | 7/2019 | Li | H05B 45/20 |
| 2021/0153327 | A1 * | 5/2021 | Shen | H05B 45/10 |
| 2022/0128202 | A1 * | 4/2022 | Shen | H05B 47/16 |
| 2023/0371147 | A1 * | 11/2023 | Hsu | H05B 45/327 |
| 2024/0172341 | A1 * | 5/2024 | Lin | H05B 45/39 |
| 2025/0220795 | A1 * | 7/2025 | Huang | H05B 47/197 |

* cited by examiner

*Primary Examiner* — Jason M Crawford
(74) *Attorney, Agent, or Firm* — Bayramoglu Law Offices LLC

(57) ABSTRACT

The provided is a button-based power controller, including: a power supply module, where an input terminal of the power supply module is electrically connected to a live wire and a neutral wire; a main control module, where a power terminal of the main control module is electrically connected to an output terminal of the power supply module; a button control module, where the button control module includes a button and a timing indicator light, and the main control module is configured to drive the timing indicator light to be turned on or off according to a number of received button presses; and a drive module. The light string is directly connected to the power controller, such that the button control module can directly adjust the display of the light string timely, achieving more flexible control.

3 Claims, 1 Drawing Sheet

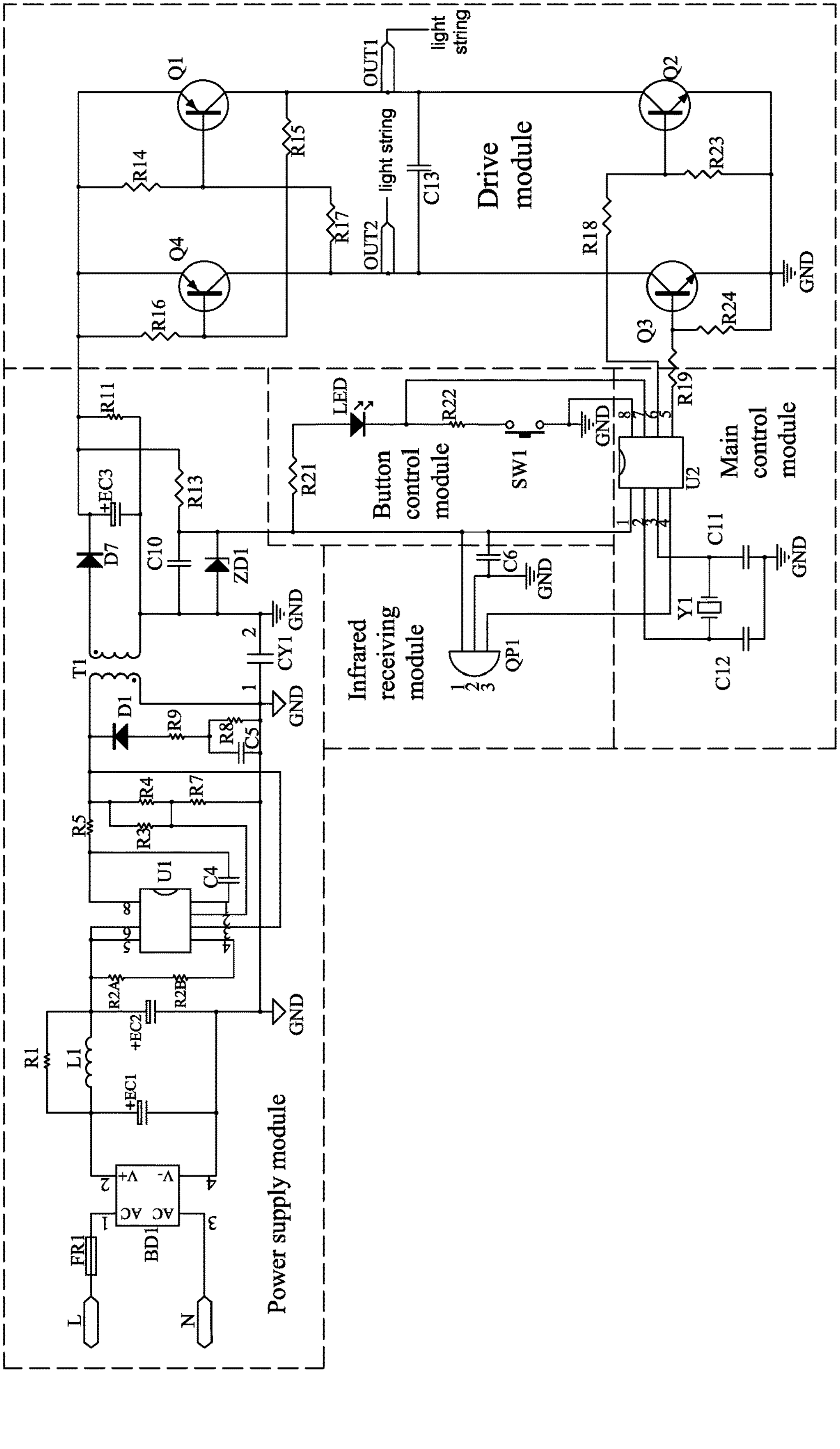
Power supply module
Infrared receiving module
Button control module
Main control module
Drive module
light string
light string
OUT1
OUT2
GND
L
N
FR1
BD1
AC
AC
V+
V-
EC1
EC2
EC3
L1
R1
R2A
R2B
R3
R4
R5
R7
R8
R9
R11
R13
R14
R15
R16
R17
R18
R19
R21
R22
R23
R24
U1
U2
C4
C5
C6
C10
C11
C12
C13
CY1
D1
D7
ZD1
T1
Q1
Q2
Q3
Q4
QP1
Y1
SW1
LED

BUTTON-BASED POWER CONTROLLER

CROSS-REFERENCE TO THE RELATED APPLICATIONS

This application is based upon and claims priority to Chinese Patent Application No. 202520503514.2, filed on Mar. 21, 2025, the entire contents of which are incorporated herein by reference.

TECHNICAL FIELD

The present disclosure relates to the technical field of power controllers and in particular to a button-based power controller.

BACKGROUND

With the development of science and technology, light-emitting diode (LED) lights have been applied more widely. In some festivals such as Christmas, LED light strings are used for lighting to enhance the atmosphere. The LED light strings refer to strip-shaped light bars formed by assembling LEDs on strip-shaped flexible circuit boards.

Most light strings available on the markets are directly turned on or off via physical buttons. These physical buttons can only function as main switches to turn the light strings on or off. To enhance display effect of the light strings, wireless remote control functions are provided for the light strings in the prior art. Based on signals from wireless remote controllers, the light strings are controlled for lighting in different modes, at different brightness levels, and for different durations.

However, the wireless remote controllers are not always placed near the light strings in actual use. The remote controllers need to be paired before the light strings are controlled, resulting in untimely and inflexible control over the light strings.

SUMMARY

A technical problem to be solved by the present disclosure is to provide a button-based power controller, to overcome the defect that light strings cannot be adjusted timely in the prior art.

The present disclosure provides a button-based power controller, including:

- a power supply module, where an input terminal of the power supply module is electrically connected to a live wire and a neutral wire;
- a main control module, where a power terminal of the main control module is electrically connected to an output terminal of the power supply module;
- a button control module, where the button control module includes a button and a timing indicator light; a positive terminal of the timing indicator light is electrically connected to the output terminal of the power supply module; a negative terminal of the timing indicator light is connected in series with the button and then grounded; a connection terminal between the negative terminal of the timing indicator light and the button is electrically connected to the main control module; and the main control module is configured to drive the timing indicator light to be turned on or off according to a number of received button presses; and
- a drive module, where an input terminal of the drive module is electrically connected to the main control module; an output terminal of the drive module is electrically connected to a light string; and the main control module is configured to control the drive module to adjust a lighting mode, a lighting duration, and lighting brightness of the light string according to the number of received button presses and a triggered duration signal.

The button-based power controller provided by the present disclosure has the following advantages over the prior art: The button control module is disposed on the power controller. According to the number of received button presses and the triggered duration signal, the drive module is controlled to adjust the lighting mode, the lighting duration, and the lighting brightness of the light string. The light string is directly connected to the power controller, such that the light string can be adjusted timely and controlled more flexibly.

In a possible implementation, the power supply module includes a bridge rectifier BD1, a voltage regulator U1, a transformer T1, and a filtering and voltage regulation circuit; an alternating-current (AC) input terminal of the bridge rectifier BD1 is electrically connected to the live wire and the neutral wire; a direct-current (DC) output terminal of the bridge rectifier BD1 is electrically connected to an input terminal of the voltage regulator U1; an output terminal of the voltage regulator U1 is electrically connected to a primary side of the transformer T1; a secondary side of the transformer T1 is electrically connected to an input terminal of the filtering and voltage regulation circuit; and an output terminal of the filtering and voltage regulation circuit is electrically connected to the power terminal of the main control module.

Compared with the prior art, AC is converted into DC via the bridge rectifier. Through voltage stabilization of the voltage regulator and voltage transformation of the transformer, and through the filtering and voltage regulation circuit, a stable power supply is ensured for the drive module and the main control module.

In a possible implementation, the filtering and voltage regulation circuit includes a resistor R11, a resistor R13, a capacitor C10, an electrolytic capacitor EC3, a diode D7, and a Zener diode ZD1; a positive terminal of the secondary side of the transformer T1 is electrically connected to an anode of the diode D7; a cathode of the diode D7 is electrically connected to a negative terminal of the secondary side of the transformer T1 through the electrolytic capacitor EC3; the resistor R11 is connected in parallel to two terminals of the electrolytic capacitor EC3; the cathode of the diode D7 is electrically connected to the negative terminal of the secondary side of the transformer T1 through the resistor R13 and the capacitor C10 that are connected in series; an anode of the Zener diode ZD1 is electrically connected to the negative terminal of the secondary side of the transformer T1; a connection terminal between the resistor R13 and the capacitor C10 is electrically connected to a cathode of the Zener diode ZD1; the connection terminal between the resistor R13 and the capacitor C10 is electrically connected to the power terminal of the main control module; and the cathode of the diode D7 is electrically connected to a power supply terminal of the drive module.

Compared with the prior art, with the diode D7, a short-circuit current when the drive module and the light string are shorted does not enter one terminal of the transformer to damage the power supply. With the capacitor C10 and the Zener diode ZD1, voltage stabilization and filtering is realized to output a stable power signal.

In a possible implementation, the drive module includes an NPN-type triode Q1, an NPN-type triode Q2, a PNP-type triode Q3, and a PNP-type triode Q4; the main control module is electrically connected to a base of the triode Q3 through a resistor R19; the base of the triode Q3 is grounded through a resistor R24; the main control module is electrically connected to a base of the triode Q2 through a resistor R18; the base of the triode Q2 is grounded through a resistor R23; an emitter of the triode Q2 and an emitter of the triode Q3 are grounded; a capacitor C13 is electrically connected between a collector of the triode Q2 and a collector of the triode Q3; the collector of the triode Q2 is electrically connected to one terminal of the light string; the collector of the triode Q3 is electrically connected to another terminal of the light string; a base of the triode Q4 is electrically connected to an emitter of the triode Q4 through a resistor R16; the emitter of the triode Q4 is electrically connected to the output terminal of the power supply module; the base of the triode Q4 is electrically connected to a collector of the triode Q1 through a resistor R15; a base of the triode Q1 is electrically connected to an emitter of the triode Q1 through a resistor R14; the base of the triode Q1 is electrically connected to a collector of the triode Q4 through a resistor R17; the collector of the triode Q4 is electrically connected to the collector of the triode Q3; the collector of the triode Q1 is electrically connected to the collector of the triode Q2; and the emitter of the triode Q4 is electrically connected to the emitter of the triode Q1.

Compared with the prior art, through different conduction results of four triodes, a forward current or a reverse current is output to the light string to realize different lighting effects of the light string.

In a possible implementation, the button-based power controller further includes an infrared receiving module configured to receive an infrared transmitting signal; and the main control module is configured to control the drive module to turn the light string on or off according to the infrared transmitting signal received by the infrared receiving module; and the infrared receiving module includes an infrared receiving head QP1; a power terminal of the infrared receiving head QP1 is electrically connected to the output terminal of the power supply module; the power terminal of the infrared receiving head QP1 is grounded through a capacitor C6; a grounding terminal of the infrared receiving head QP1 is grounded; and a signal output terminal of the infrared receiving head QP1 is electrically connected to the main control module.

Compared with the prior art, with the infrared receiving module, the main control module can further activate the drive module through the received infrared signal, thereby controlling display effect of the light string.

BRIEF DESCRIPTION OF THE DRAWINGS

The FIGURE illustrates a circuit diagram of a button-based power controller according to the present disclosure.

DETAILED DESCRIPTION OF THE EMBODIMENTS

Those skilled in the art should understand that the implementations herein are merely intended to explain the technical principles in the embodiments of the present disclosure, rather than to limit the protection scope in the embodiments of the present disclosure. Those skilled in the art may make adjustments as needed, so as to adapt to specific application scenarios.

In the description of the present disclosure, it should be noted that, unless otherwise clearly specified, meanings of terms "connected with", and "connected to" should be understood in a broad sense. For example, the connection may be a fixed connection, a removable connection, or an integral connection, and may also be a mechanical connection, an electrical connection, a direct connection or an indirect connection through a medium. Those of ordinary skill in the art may understand specific meanings of the foregoing terms in the embodiments of the present disclosure based on a specific situation.

The present disclosure will be further described in detail below in conjunction with the accompanying drawings and specific embodiments.

Referring to the FIGURE, an embodiment of the present disclosure provides a button-based power controller, including: a power supply module, a main control module, a button control module, and a drive module.

An input terminal of the power supply module is electrically connected to a live wire and a neutral wire.

A power terminal of the main control module is electrically connected to an output terminal of the power supply module.

The button control module includes a button and a timing indicator light. A positive terminal of the timing indicator light is electrically connected to the output terminal of the power supply module. A negative terminal of the timing indicator light is connected in series with the button and then grounded. A connection terminal between the negative terminal of the timing indicator light and the button is electrically connected to the main control module. The main control module is configured to drive the timing indicator light to be turned on or off according to a number of received button presses.

An input terminal of the drive module is electrically connected to the main control module. An output terminal of the drive module is electrically connected to a light string. The main control module is configured to control the drive module to adjust a lighting mode, a lighting duration, and lighting brightness of the light string according to the number of received button presses and a triggered duration signal.

The button control module is disposed on the power controller. According to the number of button presses and the triggered duration signal, the drive module is controlled to adjust the lighting mode, the lighting duration, and the lighting brightness of the light string. The light string is directly connected to the power controller, such that the light string can be adjusted timely and controlled more flexibly.

In actual operation, if the main control module detects a single press on the button within preset time (which is timed by a crystal oscillator of the main control module), it will control the drive module to adjust the light string to enter a next lighting mode.

If the main control module detects double presses on the button within the preset time, it will control the drive module to adjust the display time of the light string, i.e., it enables the light string to achieve a timing function.

If the main control module continuously detects presses on the button within the preset time, it will control the drive module to adjust the lighting brightness of the light string.

In the embodiment, there are 15 lighting modes of the light string, including COMB autocycle, INWAVES, SEQUENTIAL, SLO-GLO, CHASING/FLASH, FADE, TWINKLE/FLASH, STEADYON, Double Fast Blink, Fast Blink, Jump Lighting 1, Jump Lighting 2, and Shiny Star.

For adjustment of the drive module on the display time of the light string, the crystal oscillator in the main control module is used for timing. After the display time reaches the preset time, the main control module controls the drive module to turn the light string off. This is the prior art, and is not described repeatedly.

For adjustment of the drive module on the lighting brightness of the light string, a duty cycle of a signal input to the drive module is adjusted by the main control module. The drive module adjusts the lighting brightness of the light string according to signals of different duty cycles. This is the prior art, and is not described repeatedly.

The power supply module includes bridge rectifier BD1, voltage regulator U1, transformer T1, and filtering and voltage regulation circuit.

An AC input terminal of the bridge rectifier BD1 is electrically connected to the live wire and the neutral wire. A DC output terminal of the bridge rectifier BD1 is electrically connected to an input terminal of the voltage regulator U1. An output terminal of the voltage regulator U1 is electrically connected to a primary side of the transformer T1. A secondary side of the transformer T1 is electrically connected to an input terminal of the filtering and voltage regulation circuit. An output terminal of the filtering and voltage regulation circuit is electrically connected to the power terminal of the main control module.

AC is converted into DC via the bridge rectifier. Through voltage stabilization of the voltage regulator and voltage transformation of the transformer, and through the filtering and voltage regulation circuit, a stable power supply is ensured for the drive module and the main control module.

The filtering and voltage regulation circuit includes resistor R11, resistor R13, capacitor C10, electrolytic capacitor EC3, diode D7, and Zener diode ZD1.

A positive terminal of the secondary side of the transformer T1 is electrically connected to an anode of the diode D7. A cathode of the diode D7 is electrically connected to a negative terminal of the secondary side of the transformer T1 through the electrolytic capacitor EC3. The resistor R11 is connected in parallel to two terminals of the electrolytic capacitor EC3. The cathode of the diode D7 is electrically connected to the negative terminal of the secondary side of the transformer T1 through the resistor R13 and the capacitor C10 that are connected in series. An anode of the Zener diode ZD1 is electrically connected to the negative terminal of the secondary side of the transformer T1. A connection terminal between the resistor R13 and the capacitor C10 is electrically connected to a cathode of the Zener diode ZD1. The connection terminal between the resistor R13 and the capacitor C10 is electrically connected to the power terminal of the main control module. The cathode of the diode D7 is electrically connected to a power supply terminal of the drive module.

With the diode D7, a short-circuit current when the drive module and the light string are shorted does not enter one terminal of the transformer to damage the power supply. With the capacitor C10 and the Zener diode ZD1, voltage stabilization and filtering is realized to output a stable power signal.

In the embodiment, the drive module includes NPN-type triode Q1, NPN-type triode Q2, PNP-type triode Q3, and PNP-type triode Q4.

The main control module is electrically connected to a base of the triode Q3 through resistor R19. The base of the triode Q3 is grounded through resistor R24. The main control module is electrically connected to a base of the triode Q2 through resistor R18. The base of the triode Q2 is grounded through resistor R23. An emitter of the triode Q2 and an emitter of the triode Q3 are grounded. Capacitor C13 is electrically connected between a collector of the triode Q2 and a collector of the triode Q3. The collector of the triode Q2 is electrically connected to one terminal of the light string. The collector of the triode Q3 is electrically connected to another terminal of the light string.

A base of the triode Q4 is electrically connected to an emitter of the triode Q4 through resistor R16. The emitter of the triode Q4 is electrically connected to the output terminal of the power supply module. The base of the triode Q4 is electrically connected to a collector of the triode Q1 through resistor R15. A base of the triode Q1 is electrically connected to an emitter of the triode Q1 through resistor R14. The base of the triode Q1 is electrically connected to a collector of the triode Q4 through resistor R17. The collector of the triode Q4 is electrically connected to the collector of the triode Q3. The collector of the triode Q1 is electrically connected to the collector of the triode Q2. The emitter of the triode Q4 is electrically connected to the emitter of the triode Q1.

Through different conduction results of four triodes, a forward current or a reverse current is output to the light string to realize different lighting effects of the light string.

In the embodiment, the button-based power controller further includes an infrared receiving module configured to receive an infrared transmitting signal. The main control module is configured to control the drive module to turn the light string on or off according to the infrared transmitting signal received by the infrared receiving module.

The infrared receiving module includes infrared receiving head QP1. A power terminal of the infrared receiving head QP1 is electrically connected to the output terminal of the power supply module. The power terminal of the infrared receiving head QP1 is grounded through capacitor C6. A grounding terminal of the infrared receiving head QP1 is grounded. A signal output terminal of the infrared receiving head QP1 is electrically connected to the main control module.

With the infrared receiving module, the main control module can further activate the drive module through the received infrared signal, thereby controlling display effect of the light string.

It should be noted that in the description of the present disclosure, terms such as "inner" and "outer" indicate orientation or position relationships based on the accompanying drawings. They are merely intended to facilitate description, rather than to indicate or imply that the mentioned device or assemblies must have a specific orientation and must be constructed and operated in a specific orientation. Therefore, these terms should not be construed as a limitation to the present disclosure.

In the description of the present application, the description with reference to the terms "one embodiment", "some embodiments", "in the embodiment", "specific examples", or "some examples" means that specific features, structures, materials, or characteristics described in combination with the embodiments or examples are included in at least one embodiment or example of the present disclosure. In this specification, the schematic expression of the above terms is not necessarily directed to the same embodiment or example. Moreover, the specific features, structures, materials, or characteristics described may be combined in a suitable manner in any one or more embodiments or examples. In addition, those skilled in the art may combine different embodiments or examples described in this specification and characteristics of the different embodiments or examples without mutual contradiction.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A button-based power controller, comprising:

a power supply module, wherein an input terminal of the power supply module is electrically connected to a live wire and a neutral wire;

a main control module, wherein a power terminal of the main control module is electrically connected to an output terminal of the power supply module;

a button control module, wherein the button control module comprises a button and a timing indicator light; a positive terminal of the timing indicator light is electrically connected to the output terminal of the power supply module; a negative terminal of the timing indicator light is connected in series with the button and grounded; a connection terminal between the negative terminal of the timing indicator light and the button is electrically connected to the main control module; and the main control module is configured to drive the timing indicator light to be turned on or off according to a number of received button presses;

a drive module, wherein an input terminal of the drive module is electrically connected to the main control module; an output terminal of the drive module is electrically connected to a light string; and the main control module is configured to control the drive module to adjust a lighting mode, a lighting duration, and lighting brightness of the light string according to the number of received button presses and a triggered duration signal;

wherein the power supply module comprises a bridge rectifier BD1, a voltage regulator U1, a transformer T1, and a filtering and voltage regulation circuit;

an alternating-current (AC) input terminal of the bridge rectifier BD1 is electrically connected to the live wire and the neutral wire; a direct-current (DC) output terminal of the bridge rectifier BD1 is electrically connected to an input terminal of the voltage regulator U1; an output terminal of the voltage regulator U1 is electrically connected to a primary side of the transformer T1; a secondary side of the transformer T1 is electrically connected to an input terminal of the filtering and voltage regulation circuit; and an output terminal of the filtering and voltage regulation circuit is electrically connected to the power terminal of the main control module;

wherein the filtering and voltage regulation circuit comprises a resistor R11, a resistor R13, a capacitor C10, an electrolytic capacitor EC3, a diode D7, and a Zener diode ZD1;

a positive terminal of the secondary side of the transformer T1 is electrically connected to an anode of the diode D7; a cathode of the diode D7 is electrically connected to a negative terminal of the secondary side of the transformer T1 through the electrolytic capacitor EC3; the resistor R11 is connected in parallel to two terminals of the electrolytic capacitor EC3; the cathode of the diode D7 is electrically connected to the negative terminal of the secondary side of the transformer T1 through the resistor R13 and the capacitor C10 that are connected in series; an anode of the Zener diode ZD1 is electrically connected to the negative terminal of the secondary side of the transformer T1; and a connection terminal between the resistor R13 and the capacitor C10 is electrically connected to a cathode of the Zener diode ZD1; and the connection terminal between the resistor R13 and the capacitor C10 is electrically connected to the power terminal of the main control module; and the cathode of the diode D7 is electrically connected to a power supply terminal of the drive module.

2. The button-based power controller according to claim 1, wherein the drive module comprises an NPN-type triode Q1, an NPN-type triode Q2, a PNP-type triode Q3, and a PNP-type triode Q4;

the main control module is electrically connected to a base of the triode Q3 through a resistor R19; the base of the triode Q3 is grounded through a resistor R24; the main control module is electrically connected to a base of the triode Q2 through a resistor R18; the base of the triode Q2 is grounded through a resistor R23; an emitter of the triode Q2 and an emitter of the triode Q3 are grounded; a capacitor C13 is electrically connected between a collector of the triode Q2 and a collector of the triode Q3; the collector of the triode Q2 is electrically connected to a first terminal of the light string; and the collector of the triode Q3 is electrically connected to a second terminal of the light string; and a base of the triode Q4 is electrically connected to an emitter of the triode Q4 through a resistor R16; the emitter of the triode Q4 is electrically connected to the output terminal of the power supply module; the base of the triode Q4 is electrically connected to a collector of the triode Q1 through a resistor R15; a base of the triode Q1 is electrically connected to an emitter of the triode Q1 through a resistor R14; the base of the triode Q1 is electrically connected to a collector of the triode Q4 through a resistor R17; the collector of the triode Q4 is electrically connected to the collector of the triode Q3; the collector of the triode Q1 is electrically connected to the collector of the triode Q2; and the emitter of the triode Q4 is electrically connected to the emitter of the triode Q1.

3. The button-based power controller according to claim 1, further comprising an infrared receiving module configured to receive an infrared transmitting signal, wherein the main control module is configured to control the drive module to turn the light string on or off according to the infrared transmitting signal received by the infrared receiving module; and the infrared receiving module comprises an infrared receiving head QP1; a power terminal of the infrared receiving head QP1 is electrically connected to the output terminal of the power supply module; the power terminal of the infrared receiving head QP1 is grounded through a capacitor C6; a grounding terminal of the infrared receiving head QP1 is grounded; and a signal output terminal of the infrared receiving head QP1 is electrically connected to the main control module.

* * * * *